United States Patent [19]
Fraser

[11] Patent Number: 5,762,466
[45] Date of Patent: Jun. 9, 1998

[54] DOLLY

[75] Inventor: Dennis John Fraser, Elstree Herts, United Kingdom

[73] Assignee: Grip House Limited, Middlesex, Great Britain

[21] Appl. No.: 640,934

[22] PCT Filed: Sep. 27, 1994

[86] PCT No.: PCT/GB94/02095

§ 371 Date: Aug. 22, 1996

§ 102(e) Date: Aug. 22, 1996

[87] PCT Pub. No.: WO95/12542

PCT Pub. Date: May 11, 1995

[30] Foreign Application Priority Data

Nov. 4, 1993 [GB] United Kingdom ............ 9322770

[51] Int. Cl.[6] .................................. B66F 19/00
[52] U.S. Cl. .......................... 414/680; 248/129; 254/124
[58] Field of Search ................ 414/680, 589, 414/590, 687; 212/232, 238; 396/419, 428; 348/129, 346.01; 254/8 B, 8 C, 8 R, 124

[56] References Cited

U.S. PATENT DOCUMENTS

| | | | |
|---|---|---|---|
| 2,224,901 | 12/1940 | Cunningham | 248/123 |
| 2,719,471 | 10/1955 | Aspden et al. | 396/428 |
| 3,281,118 | 10/1966 | Krilanovich | 254/124 |
| 5,037,068 | 8/1991 | Grottesi | 254/8 B |
| 5,423,654 | 6/1995 | Rohrbaugh | 414/687 X |

FOREIGN PATENT DOCUMENTS

| | | |
|---|---|---|
| 996019 | 8/1951 | France . |
| WO92/06034 | 4/1992 | WIPO . |

*Primary Examiner*—Donald W. Underwood
*Attorney, Agent, or Firm*—Price, Heneveld, Cooper, DeWitt & Litton

[57] ABSTRACT

A dolly has a wheeled body (10) with an upwardly-opening recess therein within which is received a rotatable base unit or turret (24) containing the hydraulics for raising and lowering a boom arm (26). The boom arm may be positioned either facing forwardly of the body (10) or laterally of the body. In each case, the boom arm is received within an aperture (30,32,34), the apertures being suitably sized to allow the boom arm to be lowered to a position below the horizontal. The base unit (24) may be lifted out of the recess, and may be used with another body of a different size.

13 Claims, 3 Drawing Sheets

DOLLY

The present invention relates to a dolly, and particularly although not exclusively to a dolly for carrying cinematographic or video cameras.

A conventional dolly has a wheeled base and a boom arm which can be raised or lowered by the camera operator, the camera being mounted on the end of the boom arm. Such dollies are normally quite large and heavy, to the extent that four people are normally needed if a dolly has to be lifted up a flight of stairs. Conventional dollies are also relatively inflexible, and a film maker would normally use one type of dolly on an open film set, and another, smaller dolly in enclosed spaces or places which are difficult of access.

It is an object of the present invention at least to alleviate the above problems of the prior art.

According to the present invention there is provided a dolly having a wheeled or tracked body, a base unit carried by the body to which a boom arm is attached, the base unit containing arm actuation means for raising or lowering the arm, and the base unit being removable as a unit from the body.

The invention may be carried into practice in a number of ways and one specific embodiment will now be described, by way of example, with reference to the accompanying drawings, in which.

Figure 1:
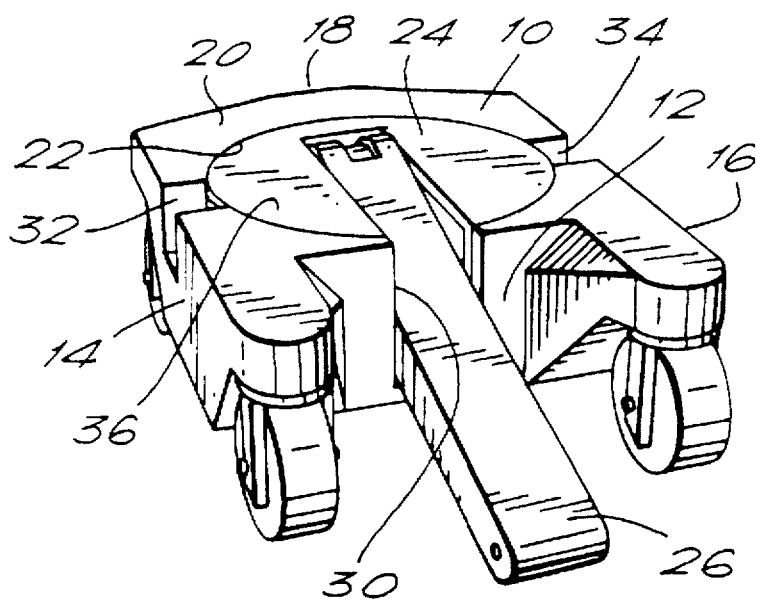
FIG. 1 shows a dolly embodying the present invention, from the front, with the boom arm facing forwardly and in a lowered position.

A dolly embodying the present invention is shown schematically in FIGS. 1 to 6. For simplicity, the operator's controls and/or seat are omitted, as is the camera and the camera mounting.

The dolly comprises a wheeled attacked body 10 of generally box shape, having front 12, side 14,16, rear 18 and top 20 surfaces. Within the body is a generally cylindrical recess, which opens into the top surface 20 via an aperture 22. Within the recess is a base unit or turret 24 which contains a hydraulic mechanism (not shown) for raising and lowering a boom arm 26 by means of one or more hydraulic rams 28. In the drawings, two hydraulic rams are shown, but it is envisaged that in practice a single ram will be preferable.

The base unit 24 has an upper circular plate 36 which, when the base unit is in position as shown in the drawings, sits substantially flush with the top surface 20 of the body. The base unit 24 also has a lower circular plate 38, which is received within a corresponding circular mounting 40 at the bottom of the recess within the body.

Figure 5:
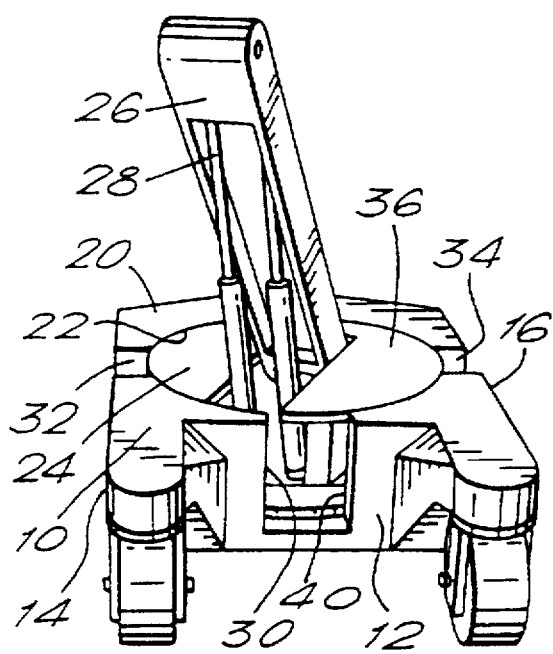
FIG. 5 shows how the base unit can rotate within the body when the boom arm is raised.
Figure 6:
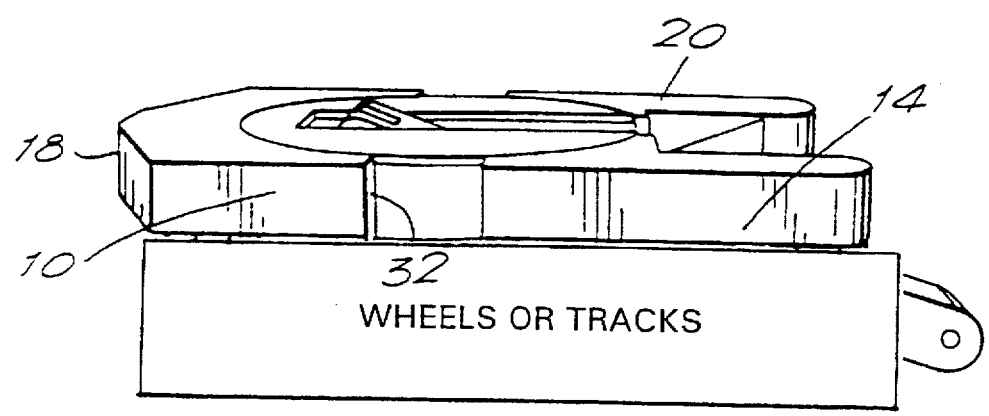
FIG. 6 shows the dolly of FIG. 1 from the side as being supported by either wheels or tracks.

When the boom arm 26 is in its raised position, as shown in FIG. 5, the base unit 24 can be rotated within the recess. In this way, the boom arm can be moved from its forwardly facing position (shown in FIGS. 1 and 2) to a transverse position (shown in FIGS. 3 and 4). It may also, of course, be moved to the opposite transverse position.

In the embodiment shown, it is necessary to raise the arm before rotating the base unit, since otherwise the hydraulic rams 28 would foul the body 10. However, it is envisaged that in other embodiments, that disadvantage might be avoided, either by repositioning the rams, by a mechanism which allows the boom arm to be raised and lowered without the use of rams, or alternatively by raising the base unit above the general plane of the body.

Figure 2:
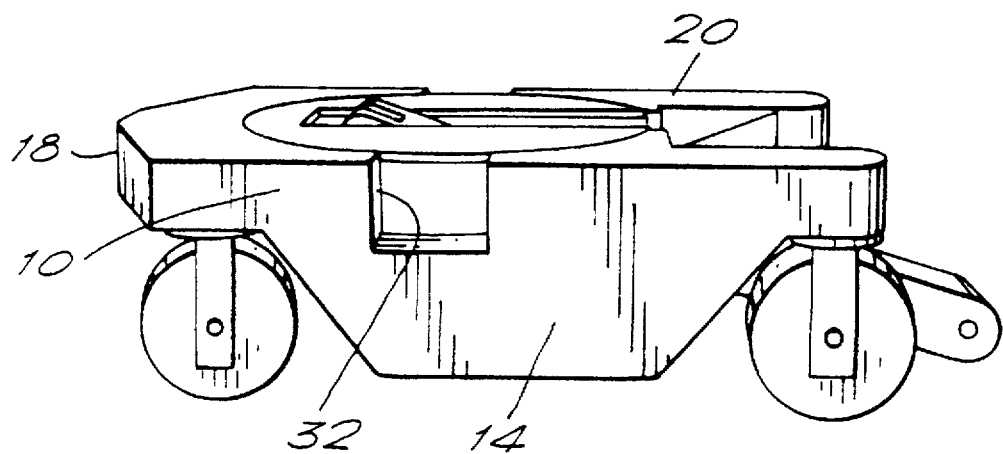
FIG. 2 shows the dolly of FIG. 1 from the side.
Figure 3:
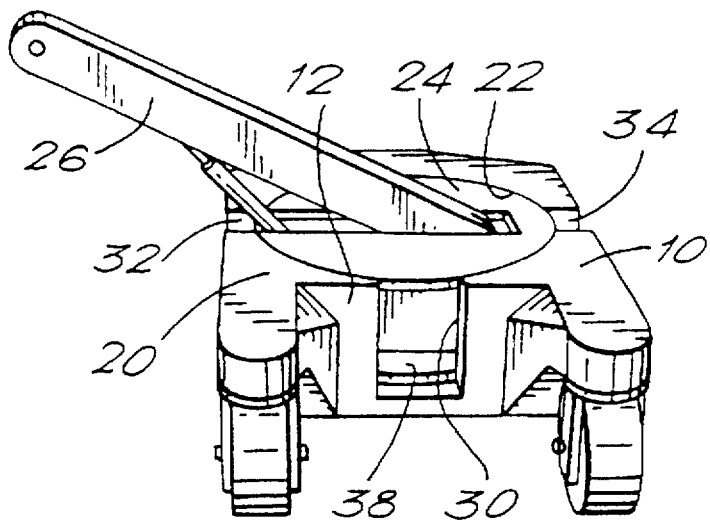
FIG. 3 shows the dolly of FIG. 1 with the boom arm raised, and in a lateral position.
Figure 4:
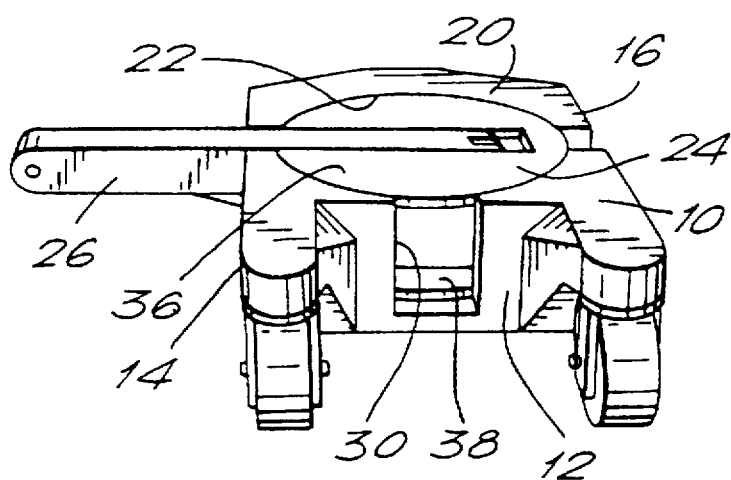
FIG. 4 shows the dolly of FIG. 1 with the boom arm in a lateral horizontal position.

The front and side surfaces 12,14,16 of the body have respective apertures 30,32,34 therein within which the boom arm may be received. These apertures are slightly wider than the width of the arm, so that there is a small amount of clearance. The depth of the apertures may be sufficiently great so that the boom arm may be lowered to a position below the horizontal, as is shown in FIGS. 1 and 2.

There may (but need not be) latching means (not shown) to hold the rotational position of the base unit steady. In the preferred embodiment, it is to be expected that filming will be undertaken only when the boom arm is facing directly forwards, or directly out towards one of the sides. However, it is not excluded that filming could take place in one of the intermediate positions, for example the position shown in FIG. 5.

The base unit is designed to be removable from the body 10, merely by lifting it out of the recess. The base unit/boom arm and the body may then be transported or carried separately. This is likely to be of considerable benefit, particularly where the dolly has to be carried to places which are difficult of access, for example up a steep narrow flight of stairs.

It is further envisaged that the base unit 24 may be used with a different body when circumstances require it. For example, the base unit could be carried within a specially narrow body for use in the aisle of an aeroplane. Alternatively, the base could be switched, as needed, between a dolly designed to run along tracks, and a crab dolly. The base could also be arranged to be mounted in "piggy-back" fashion, on a specially designed dolly, or an additional support could be provided on which the base unit could be mounted in trunnion fashion. In this way, a film maker need hire only a single interchangeable base unit for a range of shots, along with the specific bodies that he requires. He no longer needs to hire, nor to transport, one dolly for each type of shot, each dolly having its own hydraulics and boom arm.

I claim:

1. A dolly having a wheeled or tracked body and a base unit carried by the body to which a boom arm is attached at a point within the base unit, wherein the base unit contains arm actuation means for raising and lowering the arm and includes a cut-out portion arranged to receive the boom arm, and a side of the body has an aperture arranged to receive the boom arm in a lowered position, the base unit being removable as a unit from the body and freely rotatable within the body.

2. A dolly as claimed in claim 1 in which the body has a recess therein within which the base portion is received, the recess having an upwardly-facing opening via which the unit may be removed.

3. A dolly as claimed in claim 1 or claim 2 in which the base unit is rotatable about a vertical axis with respect to the body.

4. A dolly as claimed in claim 3 in which the base unit is substantially cylindrical in shape.

5. A dolly as claimed in claim 4 in which the recess is substantially cylindrical.

6. A dolly as claimed in claim 1 or 2 in which the base unit has a generally circular upper plate and a generally circular lower plate, at least one of the upper and lower plates being arranged for reception within a correspondingly-sized mount of the body.

7. A dolly as claimed in claim 6 in which the circular upper plate lies substantially flush with an upper surface of the body when the unit is received within the mount.

8. A dolly as claimed in claim 2 in which there are at least two said apertures, one facing in a direction of travel of the dolly and one at right angles thereto.

9. A dolly as claimed in claim 8 in which at least one of said apertures is of sufficient vertical extent to allow the boom arm to be lowered within the at least one said aperture to a position below the horizontal.

10. A dolly as claimed in claim 2 in which the base unit is arranged to be lowered into and lifted from the recess.

11. A dolly as claimed in claim 1, 2, 8 or 10 in which the actuation means is hydraulic.

12. A dolly as claimed in claim 11 in combination with a second body, adapted to carry the said base unit, the second body being of a different overall size from the first body.

13. A dolly as claimed in claim 11 in combination with a second body, of a different overall size from the first but having a suitably sized recess therein within which the base unit is arranged to be received.

* * * * *